July 24, 1962  F. H. MILLER, JR  3,045,802
METHOD AND APPARATUS FOR PALLETIZING
Filed Feb. 4, 1959  3 Sheets-Sheet 1
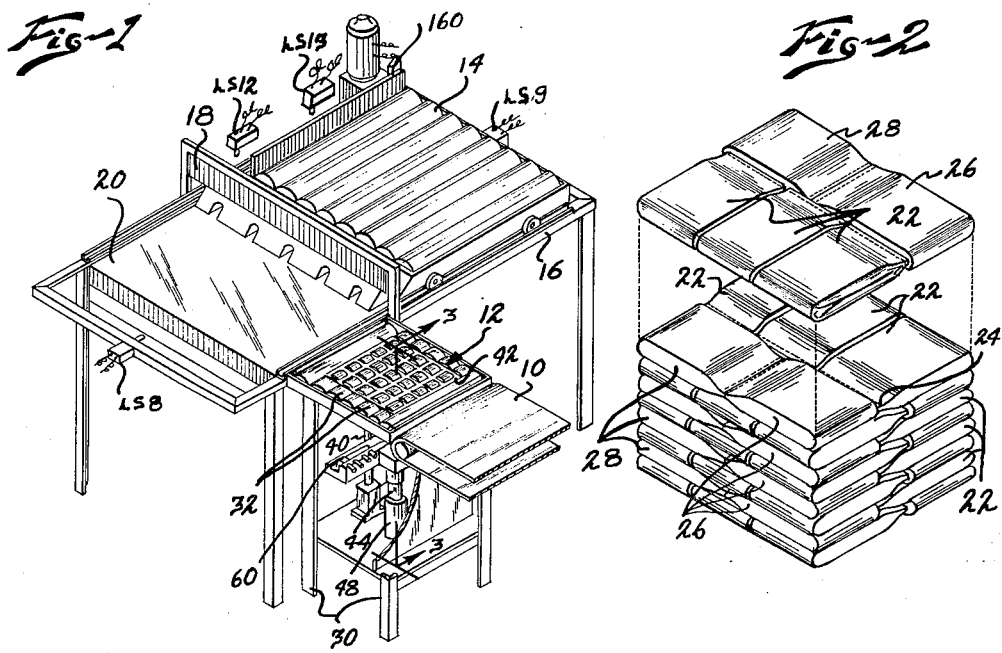
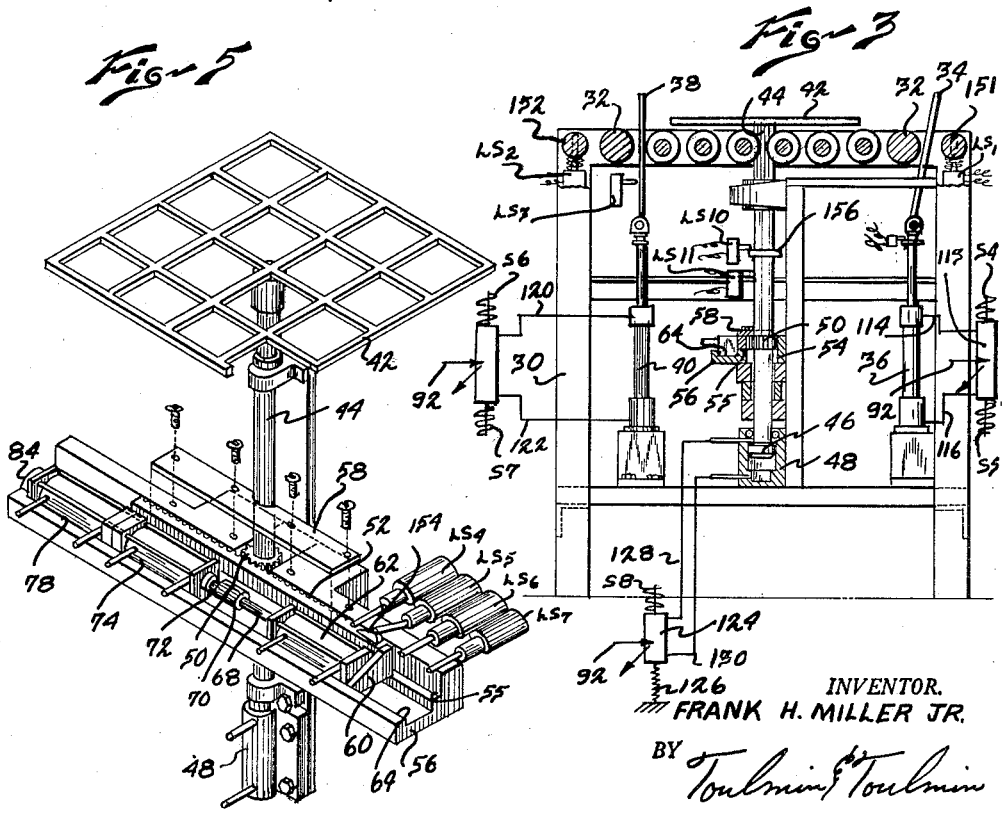
INVENTOR.
FRANK H. MILLER JR.
BY
Toulmin & Toulmin
ATTORNEYS

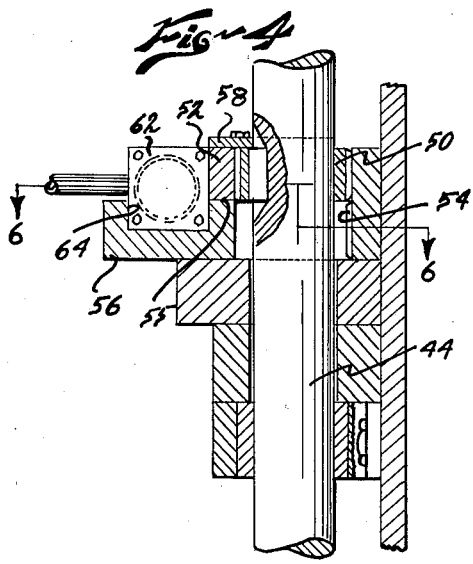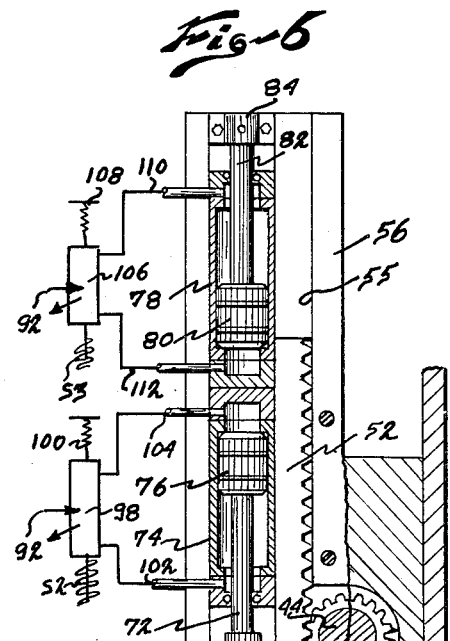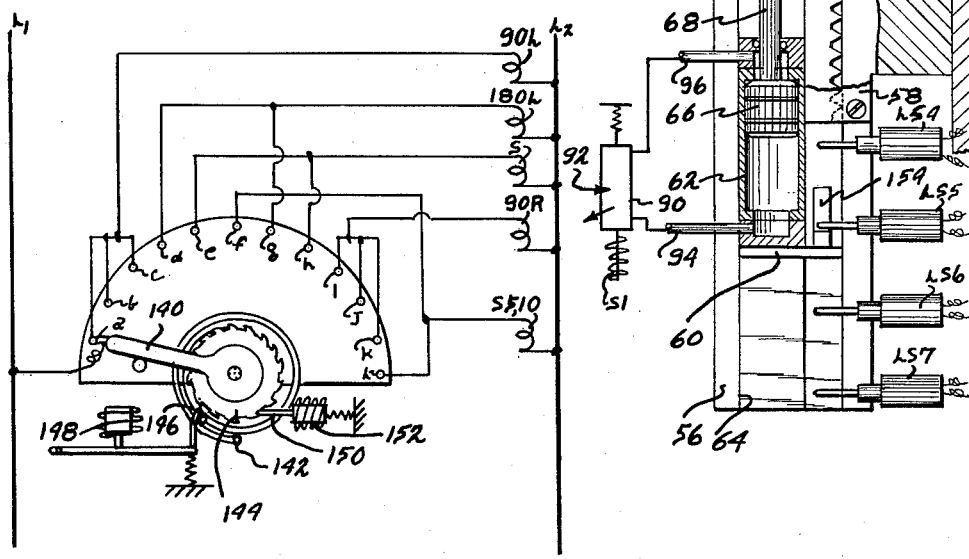

INVENTOR.
FRANK H. MILLER JR.
BY Toulmin & Toulmin
ATTORNEYS

United States Patent Office 3,045,802
Patented July 24, 1962

3,045,802
METHOD AND APPARATUS FOR PALLETIZING
Frank H. Miller, Jr., Louisville, Ky., assignor to Miller Engineering Corporation, Louisville, Ky.
Filed Feb. 4, 1959, Ser. No. 791,166
9 Claims. (Cl. 198—33)

This invention relates to palletizers and to methods of operation thereof, and particularly relates to an arrangement for turning bags and the like which are to be palletized in layers on pallets for shipping preparation.

Many articles of commerce which are packaged in boxes and bags are more conveniently handled by being arranged in layers on pallets for storage and shipment. The arranging of the boxes or bags in layers on pallets is known as palletizing, and generally involves the forming of the boxes or bags into certain patterns in the layers so that the articles in one layer are overlapping those of the next layer therebeneath thus tying the several layers together and stabilizing the pallet load.

Since most articles to be palletized are other than square, the patterning of the pallet layers is accomplished by turning some of the articles in each layer 90° to the other articles in the layer and controlling the turning so that the desired pattern is obtained.

In particular connection with the turning of bags, it is many times desirable for the end of the bag that is closed after the bagged material is placed in the bag to be turned inwardly from the outer periphery of the layer in which the bag is located which results not only in a neater pallet load, but also one in which there are no protruding portions of the bag that are apt to be snagged open or torn during handling of the pallet load.

In combining a palletizer with a conveyor system, all articles moving along the conveyor system to the palletizing station will be oriented in the same direction so that merely by counting the articles as they move along the conveyor, the proper patternizing of the articles can be accomplished.

According to the present invention, in order to turn the articles, namely, bags, so that the filling ends thereof are inwardly of the pallet load, some of the bags will be passed without turning, some will be turned 90° to the right, some will be turned 90° to the left, and still others will be turned 180°.

According to the present invention these four basic movements are accomplished automatically and with a relatively simple structure.

Having the foregoing in mind, a principal object of this invention is the provision of an improved method and apparatus for rapidly and efficiently palletizing articles such as bags of material.

A still further object of this invention is the provision of a method and apparatus for palletizing articles such as bags of materials such that the filling ends of all the bags are turned inwardly away from the outer periphery of the pallet load.

A still further object of this invention is the provision of an improved and simplified arrangement for rotating a turning platform to which the articles such as bags are delivered for the orientation thereof in the pallet layer to which they are to be delivered.

It is still a further object of this invention to provide an actuating mechanism for a liftable, rotatable platform which is extremely simple and highly efficient and which can readily be serviced if necessary at small cost.

Referring to the drawings somewhat more in detail:

FIGURE 1 is a more or less diagrammatic perspective view showing a palletizer structure embodying a turning arrangement according to this invention;

FIGURE 2 is a perspective view showing a typical arrangement of different layers in a pallet load;

FIGURE 3 is a vertical sectional view indicated by line 3—3 on FIGURE 1 showing a portion of the turning station;

FIGURE 4 is an enlarged sectional view showing the drive arrangement to the turning table;

FIGURE 5 is a perspective view showing the turning table and the actauting mechanism therefor;

FIGURE 6 is a plan sectional view indicated by line 6—6 on FIGURE 4 showing in section the drive mechanism to the turning table;

FIGURE 7 is a diagrammatic view showing a stepping switch that could be used for controlling the apparatus of the present invention;

Figure 8:
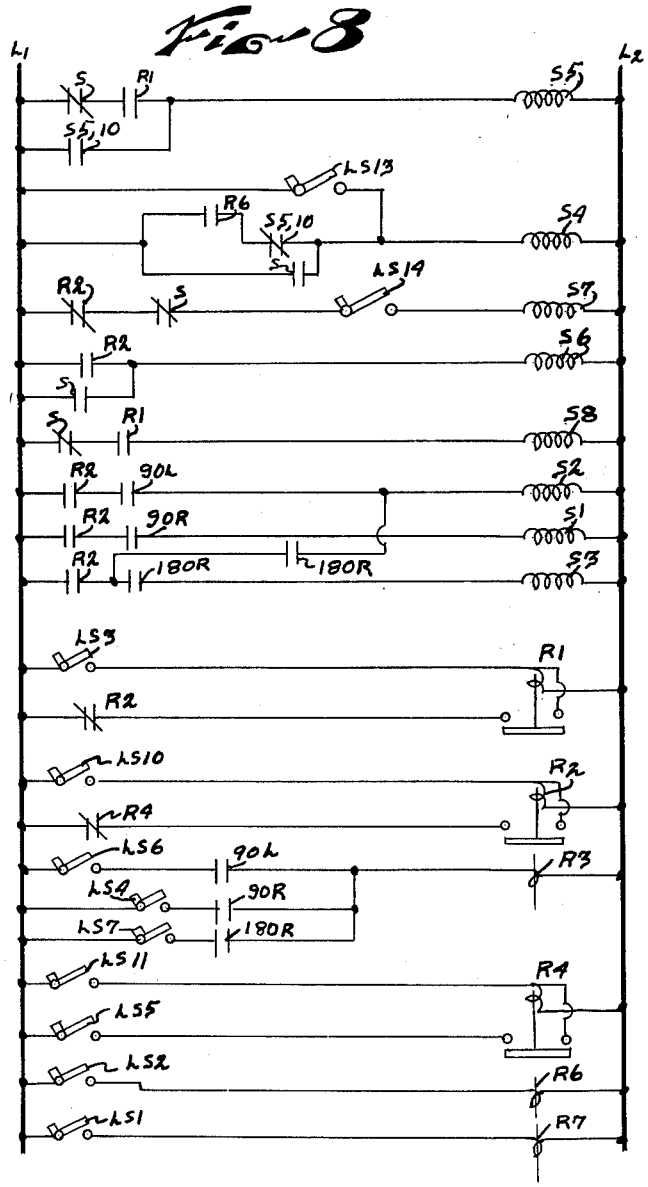
FIGURE 8 is a diagrammatic representation of one type of electric control circuit by means of which the lifting and turning table can be controlled; and, FIGURE 9 is a schematic view of another portion of the electric control circuit.

Referring to the drawings somewhat more in detail, in FIGURE 1 there is shown a conveyor 10 which may be a belt conveyor or roller conveyor or the like and along which articles such as bags are delivered to a turning station 12 where the articles are given any of four movements, namely, straight across the table without turning, a rotation of 90° clockwise or the right on the table, a rotation of 90° counter clockwise or to the left on the table, or a rotation of 180° on the table.

The articles pass on across the table either in turned or unturned position and are delivered to a roll table 14 which is arranged to reciprocate on frame 16 transversely of the direction in which the articles are delivered along conveyor 10 and across turning table 12.

The roll table 14 is movable so that after one row of articles in a layer has been delivered thereto, the table can be moved into position to accept another row of the articles, and when the layer being developed is in this manner completely built up on the roll table, the roll table is retracted rightwardly on the frame 16 and a stripper bar 18 retains the built up layer while the table retracts from therebeneath and the layer is thus transferred to an elevator 20 either directly on a pallet sheet on the elevator or on top of a preceding layer that has been delivered. By lowering the elevator progressively a desired number of layers can be built up thereon.

A palletizer of the general nature referred to is disclosed and described in detail in my issued Patent No. 2,813,638, entitled, "Palletizer," and issued November 19, 1957.

A typical pallet load is indicated more fully in FIGURE 2 wherein it will be seen that each layer comprises three bags 22 having their filling ends 24 turned toward the center of the pallet layer. As the bags approach the palletizer or conveyor 10 with their filling ends directed toward the palletizer, then each of the bags 22 in one layer represents bags that are rotated 90° to the left or counter clockwise and in the next succeeding layer represents bags that have been turned 90° clockwise or to the right. Each layer also comprises a bag 26 which has been delivered across the roll table without rotation and a bag 28 that has been rotated 180° while being delivered across the roll table. The bags could also approach with their filling openings away from the palletizer and like turning operations would be performed.

Each pallet load is a mirror image of the one therebeneath and in this manner the bags are caused to overlap and tie the various layers of the pallet load together.

The turning station according to this invention comprises a support frame 30 having arranged thereacross a plurality of rollers 32 which are driven in unison so as to advance articles thereacross to conveyor 10 to roll table 14. The rolls may be geared together or interconnected by a chain and may rotate continuously throughout the operating time of the palletizing device. An entrance stop plate 34 is vertically movable by a motor 36 to stop bags at the end of the conveyor 10 if desired and an exit stop plate 38 is similarly operable by a motor 40 to halt bags on the turning table and to release them therefrom.

The rollers 32 are segmented and thus are adapted for receiving in nested relation a grid 42 mounted on a vertically extending post or shaft 44. When the grid 42 is in its lowered position it will not interfere with the movement of the bags across the turning table and upon a bag being stopped on the turning table by elevating of stop plate 38 the grid can be moved vertically to lift the articles off rollers 32 and also to disengage the grid from its nested relation with the rollers whereupon the grid can be rotated 90° or a multiple thereof so as to turn the articles and then can be lowered to restore the articles to the influence of the rollers 32.

Post or shaft 44 extends downwardly into frame 30 and has a piston 46 on the lower end disposed within a cylinder 48 which can be supplied with pressure fluid at the lower end to elevate the grid, or can be supplied with fluid at the upper end to lower the grid. Intermediate its upper and lower ends shaft or post 44 has fixed thereto a gear 50. Gear 50, as will be seen in FIGURES 3, 4, 5 and 6, when the grid is in an elevated position meshes with a rack 52 and when the grid is in its lowered position gear 50 is disengaged from rack 52 and instead engages a single stationary tooth 54 which locks the grid in a predetermined indexed position.

Rack 52 is slidably guided in a guideway 54 provided in an elongated block member 56 carried in frame 30. Gib means 58 bolted to member 56 slidably retains the rack in position in the unit.

At its one end rack 52 is connected by a plate member 60 with one end of a cylinder 62 that is slidable in a second guide 64 in member 56. Cylinder 62 has a piston 66 therein from which extends a piston rod 68 that is connected by coupling means 70 with a piston rod 72 extending into another cylinder 74 and connected therein with a piston 76.

Cylinder 74 is also slidable in guide 64. Cylinder 74 is abutted at its end opposite the rod end thereof with the end of still another cylinder 78 having therein a piston 80 from which extends a rod 82 and which rod 82 is secured at 84 to the end of member 56 opposite the end at which rack 52 is connected with cylinder 62.

Each of cylinders 62, 74 and 78 has fluid connections at the opposite ends thereof for supplying pressure fluid thereto for moving the cylinders and pistons relatively.

It will be apparent at this point that piston 80 is fixed and that cylinders 74 and 78 can move relative thereto as a unit. Such movement could be accomplished by a supply of pressure fluid to the lower end of cylinder 78 whereupon cylinder 78, cylinder 74, piston 76, rods 72 and 68, piston 66, cylinder 62, and rack 52 would move as a unit a distance across to the stroke of piston 80 in cylinder 78.

Alternatively an equal amount of movement of rack 52 could be accomplished by a supply of pressure fluid to the upper end of cylinder 74 in which case piston 76, rods 72 and 68, piston 66, cylinder 62 and rack 52 would move the same amount as previously mentioned.

Upon a supply of fluid to both the lower end of cylinder 78 and the upper end of cylinder 74, the cylinders 78 and 74 would move the same amount as previously mentioned, but piston 76 would also move in cylinder 74 and this movement would be added to the movement of the cylinders so that rack 52 in this case would be twice the amount of movement previously referred to.

Upon a supply of fluid to the upper end of cylinder 62, this cylinder, together with the rack 52 connected therewith would move in a direction opposite to that previously described and in the amount that obtains upon the energization of only one of cylinders 74 or 78.

Gear 50 is of such a size that the above described movements provide for rotation of the gear and the post or shaft 44 connected therewith through angles of 90° clockwise, 90° counter clockwise or, 180° counter clockwise, all directions being taken as looking down on top of grid 42.

The fluid supply to cylinder 62 is under the control of a valve 90 having a valve member spring urged toward a position continuously to connect the pressure conduit 92 with conduit 94 leading to the lower end of the cylinder and said valve member being movable by energization of a solenoid S1 to interconnect pressure conduit 92 with conduit 96 leading to the upper end of the said cylinder.

Cylinder 74 similarly has valve 98 connected therewith that has a valve normally urged by a spring 100 to connect pressure port 92 with conduit 102 leading to the lower end of the cylinder and with solenoid S2 being energizable for shifting the valve member to connect the pressure conduit with conduit 104 leading to the upper end of the cylinder.

Cylinder 78 also has connected therewith a valve 106 having a valve member normally urged by spring 108 into position to connect conduit 92 with conduit 110 leading to the upper end of the cylinder and with solenoid S3 being energizable to shift the valve member to connect the pressure conduit 112 leading to the lower end of the cylinder. It will be understood that by upper and lower ends of the cylinders is meant the upper and lower ends thereof as they are viewed in FIGURE 6.

From the front of the apparatus, what has been referred to as the tops of the cylinders would be the left end and what is referred to as the bottoms of the cylinders would be the right ends thereof.

The cylinder 36 for raising and lowering plate 34 has a valve 113 connected therewith and pertaining thereto is a first solenoid S4 which, when energized will connect pressure conduit 92 with conduit 114 leading to the upper end of the cylinder, and when solenoid S5 pertaining to the valve is energized the valve will be shifted to connect pressure conduit 92 with conduit 116 leading to the bottom of cylinder 36.

Cylinder 48 pertaining to stop plate 38 similarly has a valve 118 and energization of a solenoid S6 will shift the valve to connect pressure conduit 92 to conduit 120 leading to the upper end of cylinder 40 while energization of the solenoid S7 will shift the valve to connect pressure conduit 92 with conduit 122 leading to the lower end of cylinder 40.

The grid lifting cylinder 48 has a valve 124 connected therewith normally urged by a spring 126 to connect pressure conduit 92 with conduit 128 leading to the upper end of cylinder 48 while energization of a solenoid S8 will shift the valve to connect pressure conduit 92 with conduit 130 leading to the lower end of cylinder 48.

By selective energization of the several solenoids referred to above, the stop plates and grid can be raised and lowered, and the grid can be rotated while in its elevated position.

Figure 9:
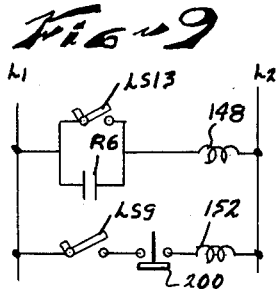

The control of the several solenoid operated valves referred to can be accomplished by a number of different types of electric control circuits and it will therefore be understood that the electric circuits of FIGURES 7, 8 and 9 are merely exemplary and are included solely for the purpose of providing a completely operative structure.

The electric control system includes a counting device which may take the form of the stepping switch of FIGURE 7. In this figure there is a contact arm 140 adapted for sweeping over a bank of contacts indicated by the small lines $a$ through $l$ inclusive.

The contact arm is on a shaft to which is attached a biasing spring 142 that continuously urges the arm counter clockwise toward the next position in which it is illustrated. A ratchet wheel 144 on the shaft is engageable by a pawl 146 operated by a solenoid 148 to index the ratchet wheel one space for each energization of the solenoid. A latch pawl 150 retains the ratchet wheel and contact arm in any indexed position until solenoid 152 is energized whereupon the latch pawl is withdrawn and the contact arm will return to its initial position.

In conjunction with the stepping switch, the electric circuit contains various limit switches for detecting the positions of the parts of the apparatus and the movement of the bags to and from the turning table. At the approach side of the table there is a roller 151 which, when depressed by a bag passed thereover, actuates a limit switch LS1. There is a similar roller 152 at the exit side of the turning table which upon being depressed actuates a limit switch LS2.

Pertaining to plate 38 is a limit switch LS3 so located as to be actuated by the plate when the plate is elevated and is engaged by a bag on the rollers of the turning table.

The rack 50 that accomplishes the turning of the grid has a cam 154 thereon and in each position which the rack occupies when the grid is rotated from one position to another it engages and operates one of limit switches LS4, LS5, LS6 and LS7. The spacing between these limit switches, is, of course, such that the grid rotates 90° when the cam 154 moves from one limit switch to the next.

The operation of the turning table is also interlocked with the operation of the roll table 14 and for the sake of simplicity there are shown only the limit switches LS8 and LS9 which are operated by the roll table at its terminal positions, LS9 being the particular one of the limit switches that influences the turning table control.

Pertaining to the grid 42 is a cam 156 on the post or shaft 44 and when the grid is in its upper position, the cam operates a limit switch LS10 and when the grid is in its lowered position the cam operates a limit switch LS11.

The stepping switch previously referred to is connected in circuit with a plurality of control relays which govern the operation of the mechanism of the turning table. The contacts a, b and c of the stepping switch are connected with the relay of a coil marked 90L which is the relay that determines that the bags will be rotated 90° to the left or counter clockwise.

Contacts d and g are connected with the coil of a relay 180R which determines that the bags will be rotated 180° in passing across the turning table, contacts e and h are connected with the coil of a relay s which determines that the bags will pass across the turning table without rotation, contacts i, j and k are connected with the coil of a relay marked 90R which will determine that the bags will be rotated 90° to the right or clockwise during their travel across the turning table and contacts f and l are connected with the coil of a relay marked S5, 10, which is a relay that provides the interlock between the operation of the turning table and the operation of the roll table 14.

Since the operation of the roll table 14 and the turning table are interlocked, it is necessary to detect the initial positions which the table occupies when bags are delivered thereto. This is accomplished by providing the table with a cam 160 which is arranged relative to a pair of limit switches LS12 and 13 such that in moving from the position which it occupies in FIGURE 1 to its first bag receiving position the cam will pass over and acutate limit switch LS13 while in its second bag receiving position the table will move cam 160 into position to pass over and actuate switch LS12, the latter switch pertaining to the roll table control circuit.

The several solenoids and limit switches above identified are shown connected in circuit in FIGURES 7, 8 and 9.

In FIGURE 8 solenoid S5 that causes stop plate 34 to move upwardly is connected in circuit with a normally closed blade of relay S and normally open blade of relay R1 with these blades being by-passed by a normally open blade on relay S5,10.

Solenoid S4 energizable to move stop plate downwardly is connected for being energized by the closing of limit switch LS13 with there being arranged in parallel with the switches a first branch containing a normally open blade of a relay R6 in series with a normally closed relay S5,10 and another branch containing a normally open blade of relay S.

Solenoid S7 energizable for moving stop plate 38 upwardly is connected in series with normally closed blades on relay R2 and relay S and a limit switch LS14 arranged to be closed when stop plate 34 is down.

Solenoid S6 energizable for causing stop plate 38 to move downwardly is connected in series with parallel connected normally open blades on relay R2 and relay S.

Solenoid S8 energizable for causing the grid to elevate is connected with a normally closed blade on relay S and a normally open blade on relay R1, the said blades being in series.

Solenoid S2 energizable for causing the grid to rotate 90° counter clockwise is connected with a normally open blade of relay R2 that is in series with a normally open blade of relay 90L.

Solenoid S1 is connected with a normally open blade of relay R2 which is in series with a normally open blade of relay 90R, solenoid S1 when energized being about 90° of clockwise movement of the grid.

Solenoid S2 is also connected by a branch wire through a normally open blade of relay 180R that is in series with a normally open blade of relay R2.

The last mentioned blade in relay R2 is also connected through another normally open blade of relay 180R with solenoid S3 simultaneously energization of solenoid S2 and S3 resulting in 180° of counter clockwise rotation of the grid.

The limit switch LS3 that is actuated when a bag strikes stop plate 38 is connected to energize relay R1 when the switch is closed with relay R1 having a holding circuit extending through a normally closed blade of relay R2. Closure of relay R1 operates the blades thereof above referred to.

Limit switch LS10 which is closed when the grid is elevated is connected to energize relay R2 which has a holding circuit extending through normally closed blade of relay R4. Relay R2 when energized actuates the blades thereof that have been previously referred to.

Relay R3 which controls the blade thereof in the holding circuit for relay R1 is connected in a circuit having three branches in series. The first branch having limit switch LS6 therein in series with a normally open blade of relay 90L, the second branch having limit switch LS4 therein in series with a normally open blade of relay 90R, and the third branch having a limit switch LS7 therein in series with a normally open blade of relay 180R. This arrangement provides for energization of relay R3 when the grid has completed its designated turned movement thereby to de-energize relay R1.

Relay R4 which has a blade in the holding circuit of relay R2 is arranged to be energized by closing of limit switch LS11 which is closed when the grid is lowered and R4 has a holding circuit in which is located limit switch LS5 which is normally closed and which is open when the grid rotating mechanism reaches its rest and which is illustrated in FIGURES 5 and 6.

The limit switch LS2 which as actuated when a bag rolls off the turning table and depresses roller 152 is arranged for energizing relay R6 and limit switch LS1 which is similarly actuated by depressing of roller 150 as a bag rolls on the table, is connected for energizing relay R7. Relay R7 is arranged to close a blade 200 on every tenth energization which indicates the movement of ten articles to the turning table.

Relay R6 has a blade connected in circuit with ratcheting solenoid 148 of the stepping switch as illustrated in FIGURE 9 so that the stepping switch is indexed each time a bag rolls off the turning table. This blade of R6 is by-passed by limit switch LS13 so that when the roll table moves to its first bag receiving position after discharging a layer, the stepping switch will be indexed.

The latching solenoid 152, as will be seen in FIGURE 9, is connected in a circuit that includes limit switch LS9, which switch indicates that the roll table 14 has completed a load discharging operation and is ready to return to its first operative position, and a relay blade 200 in the circuit which closes after two loads, or ten articles, have been discharged from the roll table so switch LS9 is effective for energizing latch solenoid 152 only on every other cycle.

Operation

Let it be assumed for the purpose of explaining the operation of the system that there is a complete layer built up on the roll table 14 and that stop plate 34 is elevated so that there is no bag on the turning table and that the stepping switch is resting with the arm 140 on contact *l*. Under these circumstances, the roll table, by its control, retracts to its FIGURE 1 position whereupon the load is stripped therefrom and is dropped on the elevator platform, the elevator platform lowers an amount equal to the thickness of the layer delivered thereto, and the roll table 14 then advances to its first bag receiving position.

When the elevator platform reaches its fully retracted position it actuates limit switch LS9 thus energizing latch solenoid 152 and releasing the stepping switch so that it returns under the influence of spring 142 to its first position where contact 140 rests on contact *a*.

As the roll table approaches its first bag receiving position cam 160 passes over switch LS13 and this energizes solenoid S4 causing plate 34 to move downwardly and admits a bag to the turning table. This bag advances until it strikes stop plate 38 thus actuating switch LS3 and energizing relay R1. Energization of relay R1 energizes solenoid S5 that causes stop plate 34 again to elevate. Relay R1 also energizes solenoid S8 causing grid 42 to elevate.

When the grid is completely up, it closes switch LS10 and this energizes relay R2. Energization of relay R2 energizes solenoid S6 to cause stop plate 38 to move downwardly. Other blades on relay R2 close circuits to the turning solenoids S1, S2, and S3 and the one thereof which is effective is determined by the position occupied by stepping switch 140. In this case, the switch is resting on contact *a* and accordingly relay 90L is energized and this closes blades in circuit with solenoid S2 and with relay R3.

Accordingly, solenoid S2 is energized and this brings about a supply of fluid through conduit 104 to cause movement of rack 52 to rotate the bag on the elevated grid 90° counter clockwise. When the grid has rotated 90° counter clockwise, limit switch LS6 is actuated and this brings about energization of relay R3.

Relay R3 has a normally closed blade in the holding circuit of relay R1 and this causes de-energization of relay R1 which causes de-energization of solenoid S8 to permit the grid 42 to descend thus returning the turned bag to the influence of rollers 32 and the bag will then proceed on to the roll table 14. When the grid 42 reaches its lower position it closes limit switch LS11 and this energizes relay R4 that has a holding circuit through normally closed limit switch LS5. Relay R4 has a normally closed blade in the holding circuit of relay R2 so energization of R4 will de-energize relay R2. De-energization of relay R2 de-energizes solenoid S2 so that the rack 52 is now returned toward its starting position and in which position it will halt because of the pistons bottoming in their respective cylinders. When the rack reaches its rest position cam 154 engages and opens limit switch LS5 and this de-energizes relay R4 and returning the turning mechanism and all its controls to the starting condition.

The bag moving from the turning table to the roll table passes over roll 152 and operates limit switch LS2. This limit switch energizes relay R6 which has one blade in circuit with ratcheting solenoid 148 so that at this time the stepping switch indexes so that arm 142 rests on contact *b*. Relay R6 also has a blade in circuit with solenoid S4 so that at this time solenoid S4 is also energized causing stop plate 34 to move downwardly and admit a new bag to the turning table.

Solenoid S7 pertaining to stop plate 38 is energized when stop plate 34 reaches its lowermost position and closes limit switch LS14 so that oncoming bags will engage stop plate 38 as previously described.

The series of steps recited above are repeated twice over thus giving a row of three turned bags as appears at the left side of the top layer in FIGURE 2, it being understood that it has been assumed that the bags are approaching the palletizer bottom first. The delivery of the third bag indexes the stepping switch to bring arm 140 into engagement with contact *d* and this energizes relay 180R so that when the fourth bag is supplied to the turning table and the grid lifts the bag, relay 180L is energized so that solenoids S2 and S3 are both energized causing the rack to be moved far enough to rotate the grid and the bag thereon 180° and at which time cam 154 actuates switch LS7 to energize relay R3 that brings about discharging of the bag as aforementioned to the roll table.

Discharging of the bag brings about indexing of the stepping switch to engage contact *e* thereof which is in circuit with relay S. Energization of relay S opens a blade thereof in circuit with solenoid S7 and closes blades in circuit with solenoids S4 and S6 so that both stop plates move downwardly. Another normally closed blade in circuit with solenoid S8 is opened thus preventing raising of the grid. Under these conditions the bag moves straight across the turning table and is delivered to the roll table without turning. As the unturned bag passes over roller 152, the stepping switch is again indexed and thus engages contact *f* which is in circuit with relay S5,10. Indexing of the stepping switch de-energizes relay S and the blade thereof in circuit with solenoid S7 is thus closed and stop plate 38 raises to its upper position.

Also, the blade of relay S in circuit with solenoid 5 opens and simultaneously the blade of relay S5,10 in circuit with solenoid S5 closes so that stop plate 34 also raises. The table control at this time, since a complete layer has been delivered to the table, causes the table to retract as described before and then to advance to its intermediate position, and to carry out the same steps as previously described except there is no energization of latch solenoid 152 on account of the interlock blade 200 in circuit therewith which is only closed after there have been ten bags delivered to the roll table. However, return of the roll table to its first bag receiving position actuates limit switch LS13 thus energizing solenoid S4 which causes stop plate 34 to move down and admit a bag to the turning table.

Closing of switch LS13 also energizes ratchet solenoid 148 and advances the stepping switch into contact with contact *g* that is in circuit with relay 180R so that the turning cycle that thus obtains is one of turning the bag 180°. The same series of steps previously described are then carried out except that the bags following the one turned 180° are, in order, passed first across the turning table without turning, and then three thereof are turned 90° clockwise thus making up a complete pallet layer which is the mirror image of the first layer delivered to the roll table. A complete cycle has now been completed and upon retraction of the roll table, the stepping switch will be returned to its starting position because at this time blade 200 and LS9 will both be closed.

The control of the interlock blade 200 that is in circuit with the latch solenoid 152 may conveniently be controlled by a control mechanism operated by relay R7 which is under the influence of switch LS1 that is operated by roll 152 at the incoming side of the turning table.

In the manner described above, the arrangement operates continuously to supply layers of bags to the roll table in which all of the filling opening ends of the bags are turned inwardly and with each pallet layer being the mirror image of the one therebeneath so that the layers interlock. Adhesive can be supplied in ribbons to the bottoms of the bags as they are discharged from the roll table thereby adhesively joining the several layers together, if so desired.

The present invention, however, is concerned primarily with the novel turning table construction, the controls therefor, and the novel actuating means consisting of the tandem arranged hydraulic motors and the controls for the valves pertaining thereto.

It will be understood that this invention is susceptible to modifictaion in order to adapt it to different usages and conditions; and, accordingly, it is desired to comprehend such modifications within this invention as may fall within the scope of the appended claims.

What is claimed is:

1. In a turning station for a palletizing apparatus, articles being delivered to one side of said turning station in a predetermined oriented position, a plurality of continuously driven segmented rolls in said turning station to advance articles from the said one side to the other side thereof, a grid nesting in said segmented rolls and normally located below the tops of said rolls, a shaft attached to the center of the grid and extending downwardly therefrom, a hydraulic motor connected to the bottom of said shaft energizable for lifting the grid to a position above the rolls, a pinion on said shaft, a rack positioned to mesh with the pinion when the grid is elevated and to be disengaged from the pinion when the grid is lowered, and a plurality of reciprocating hydraulic motors connected in tandem between said rack and a fixed point, said tandem arranged motors being energizable for rotating the pinion and shaft and, therefore, said grid 90° in either direction or 180° in one direction.

2. In a turning station for a palletizer, there being means for delivering articles to be palletized in a predetermined oriented position to one side of the turning station, said turning station comprising a frame, a plurality of segmented rolls extending across the frame and continuously driven to advance articles from the said one side of the turning station to the other, a rectangular grid nested with the segmented rolls and normally positioned below the tops of the rolls so that articles can pass directly across the grid, means for stopping articles when positioned above the grid, a shaft extending downwardly from the middle of the grid, a motor connected to the bottom of the shaft for elevating the shaft and grid to a position where the grid is above the rolls, a pinion on the shaft, a rack located so as to mesh with the pinion when the grid is elevated and to be spaced from the pinion when the grid is lowered, three hydraulic motors connected in tandem between the frame of the turning station and said rack, said hydraulic motors being arranged so that energization of a first thereof will rotate the rack 90° in one direction whereas energization of a second thereof will rotate the rack 90° in the other direction, and rotation of the first and third thereof will rotate the rack 180°, means for lowering the grid after it has been so rotated, and means for returning the hydraulic motors to their starting position after the grid has been so rotated and lowered.

3. In a turning station for a palletizer, there being means for delivering articles to be palletized in a predetermined oriented position to one side of the turning station, said turning station comprising a frame, a plurality of segmented rolls extending across the frame and continuously driven to advance articles from the said one side of the turning station to the other, a rectangular grid nested with the segmented rolls and normally positioned below the tops of the rolls so that articles can pass directly across the grid, means for stopping articles when positioned above the grid, a shaft extending downwardly from the middle of the grid, a motor connected to the bottom of the shaft for elevating the shaft and grid to a position where the grid is above the rolls, a pinion on the shaft, a rack located so as to mesh with the pinion when the grid is elevated and to be spaced from the pinion when the grid is lowered, three hydraulic motors connected in tandem between the frame of the turning station and said rack, said hydraulic motors being arranged so that energization of a first thereof will rotate the rack 90° in one direction whereas energization of a second thereof will rotate the rack 90° in the other direction, and rotation of the first and third thereof will rotate the rack 180°, means for lowering the grid after it has been so rotated, and means for returning the hydraulic motors to their starting position after the grid has been so rotated and lowered, there being means for locking said grid in its rotated position as it is lowered and the pinion disengages from said rack.

4. In a turning station for a palletizer; a frame, a plurality of continuously rotating rolls in the frame to advance articles from one side thereof to the other, a grid nested with said rolls normally below the tops of said rolls, a stop plate movable to halt articles passing across said station above said grid, a shft connected with the middle of the grid and extending downwardly into the frame, a motor connected with the shaft to raise the shaft and grid to position the grid above the rolls, a pinion on the shaft, a rack located so that when the grid is elevated the pinion will mesh with the rack and when the grid is lowered the pinion will be separated from the rack, three reciprocating hydraulic motors connected in tandem between the frame and the rack, individual valves for controlling the supply of fluid to said motors, and means for controlling said valves to obtain rotation of said shaft and grid in increments of 90° in one direction or the other, means for lowering the grid after it is so rotated, and means for returning the hydraulic motors to their starting position following rotation of said grid.

5. In a turning station for a palletizer; a frame, a plurality of continuously rotating rolls in the frame to advance articles from one side thereof to the other, a grid nested with said rolls normally below the tops of said rolls, a stop plate movable to halt articles passing across said station above said grid, a shaft connected with the middle of the grid and extending downwardly into the frame, a motor connected with the shaft to raise the shaft and grid to position the grid above the rolls, a pinion on the shaft, a rack located so that when the grid is elevated the pinion will mesh with the rack and when the grid is lowered the pinion wlil be separated from the rack, three reciprocating hydraulic motors connected in tandem between the frame and the rack, individual valves for controlling the supply of fluid to said motors, and means for controlling said valves to obtain rotation of said shaft and grid in increments of 90° in one direction or the other, means for lowering the grid after it is so rotated, and means for returning the hydraulic motors to their starting position following rotation of said grid, two of said hydraulic motors when energized moving the rack in one direction and the other of said hydraulic motors when energized moving the said rack in the opposite direction.

6. In a turning station for a palletizer; a frame, a plurality of continuously rotating rolls in the frame to advance articles from one side thereof to the other, a grid nested with said rolls normally below the tops of said rolls, a stop plate movable to halt articles passing across said station above said grid, a shaft connected with the middle of the grid and extending downwardly into the frame, a motor connected with the shaft to raise the shaft and grid to position the grid above the rolls, a pinion on the shaft, rack located so that when the grid is elevated the pinion will mesh with the rack and when the grid is lowered the pinion will be separated from the rack, three reciprocating hydraulic motors connected in tandem between the frame and the rack, each comprising a cylinder part and a ram part, each ram having a stroke in its pertaining cylinder that will move the rack a distance sufficient to rotate the pinion, shaft, and grid 90°, reversing valves connected with said motors and each valve having a position where the ram of the pertaining motor is extended and another position where the ram of the pertaining motor is retracted, two of said valves normally being in one of their said positions and the other valve being in the other of the said positions, means for selectively shifting either one or both of said two valves to obtain either 90° or 180° rotation of the grid, and means for shifting the said other valve to obtain 90° rotation of the grid in the opposite direction.

7. In a turning station for a palletizer or the like; a platform to which articles are delivered, a shaft extending downwardly from the platform, a rack adjacent the shaft, a pinion on the shaft adapted for meshing the said rack, three hydraulic motors connected in tandem each comprising a cylinder and a ram, a supporting guideway supporting and guiding said rack and said cylinders, said tandem motors being connected at one end to said rack and at the other end to said guideway, one of said motors normally having its ram extended and the other two normally having their rams retracted, means for selectively actuating said one motor, or one of said other two motors, or both of said other two motors, when the pinion is meshing with said rack thereby to obtain rotation of said shaft in predetermined increments in one direction or the other, means for reciprocating said shaft and pinion to lift the platform and bring the pinion into mesh with the rack or to lower the platform and disengage said pinion from the rack, means to lock said pinion against rotation when lowered and disengaged from said rack, and control means operable to control the actuation of said motors in a predetermined sequence on successive reciprocations of said shaft and pinion.

8. In a turning station for a palletizer or the like; a platform to which articles are delivered, a shaft extending downwardly from the platform, a rack adjacent the shaft, a pinion on the shaft adapted for meshing the said rack, three hydraulic motors connected in tandem each comprising a cylinder and a ram, a supporting guideway supporting and guiding said rack and said cylinders, said tandem motors being connected at one end to said rack and at the other end to said guideway, one of said motors normally having its ram extended and the other two normally having their rams retracted, means for selectively actuating said one motor, or one of said other two motors, or both of said other two motors, when the pinion is meshing with said rack thereby to obtain rotation of said shaft predetermined increments in one direction or the other, each said ram having a stroke in its pertaining cylinder sufficient to impart exactly 90° of rotation to said shaft, means for reciprocating said shaft and pinion to lift said platform and to bring the pinion into mesh with said rack or to lower said platform and disengage the pinion from the rack, means for locking said pinion against rotation when disengaged from said rack, and control means operable for causing actuation of said motors according to predetermined different sequences on successive reciprocation of said shaft and pinion.

9. In a turning station for a palletizer or the like; a platform to which articles are delivered, a shaft extending downwardly from the platform, a rack adjacent the shaft, a pinion on the shaft adapted for meshing the said rack, three hydraulic motors connected in tandem each comprising a cylinder and a ram, a supporting guideway supporting and guiding said rack and said cylinders, said tandem motors being connected at one end to said rack and at the other end to said guideway, one of said motors normally having its ram extended and the other two normally having their rams retracted, and means for selectively actuating said one motor, or one of said other two motors, or both of said other two motors, when the pinion is meshing with said rack thereby to obtain rotation of said shaft in predetermined increments in one direction or the other, each said ram having a stroke in its pertaining cylinder sufficient to impart exactly 90° of rotation to said shaft, there being means to raise and lower said shaft to raise and lower said platform and to bring the pinion into mesh or out of mesh, respectively, with said rack, means responsive to the raising of the shaft for causing actuation of said motors, and to the lowering of said shaft for returning said motors to their original positions, and control means operable for causing actuation of said motors according to a predetermined different sequence on successive reciprocations of said shaft and pinion, said sequence being repetitive.

References Cited in the file of this patent

UNITED STATES PATENTS

| 1,672,767 | McDonnall | June 5, 1928 |
| 2,538,505 | Carter | Jan. 16, 1951 |
| 2,672,773 | Schofield | Mar. 23, 1954 |
| 2,672,990 | Sundin | Mar. 23, 1954 |
| 2,813,638 | Miller | Nov. 19, 1957 |
| 2,819,806 | Vieth | Jan. 14, 1958 |